US012739306B2

(12) United States Patent
Lu et al.

(10) Patent No.: US 12,739,306 B2
(45) Date of Patent: Sep. 15, 2026

(54) COMMUNICATION METHOD AND COMMUNICATIONS APPARATUS

(71) Applicant: GUANGDONG OPPO MOBILE TELECOMMUNICATIONS CORP., LTD., Dongguan (CN)

(72) Inventors: Fei Lu, Dongguan (CN); Haorui Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 44 days.

(21) Appl. No.: 18/903,869

(22) Filed: Oct. 1, 2024

(65) Prior Publication Data

US 2025/0030776 A1 Jan. 23, 2025

Related U.S. Application Data

(63) Continuation of application No. PCT/CN2022/102841, filed on Jun. 30, 2022.

(51) Int. Cl.
*H04L 67/51* (2022.01)

(52) U.S. Cl.
CPC .................................. *H04L 67/51* (2022.05)

(58) Field of Classification Search
CPC ...................................................... H04L 67/51
See application file for complete search history.

(56) References Cited

U.S. PATENT DOCUMENTS

| | | | | |
|---|---|---|---|---|
| 10,349,257 | B1 * | 7/2019 | Bakker | H04W 4/90 |
| 2017/0318463 | A1 | 11/2017 | Lee et al. | |
| 2019/0174449 | A1 * | 6/2019 | Shan | H04W 60/00 |
| 2019/0394814 | A1 * | 12/2019 | Bakker | H04W 4/90 |

FOREIGN PATENT DOCUMENTS

| | | | |
|---|---|---|---|
| CN | 108809565 | A | 11/2018 |
| CN | 110557785 | A | 12/2019 |
| CN | 110574407 | A | 12/2019 |

OTHER PUBLICATIONS

PCT International Search Report for International Application No. PCT/CN2022/102841 dated Dec. 10, 2022.
PCT Written opinion for International Application No. PCT/CN2022/102841 dated Dec. 10, 2022.
"3rd Generation Partnership Project; Technical Specification Group Services and System Aspects; Security aspects of Machine-Type and other Mobile Data Applications Communications Enhancements; (Release 12)", 3GPP TR 33.868 V0.15.0, text pp. 71-82, dated Sep. 2013.
Huawei et al., "IEIs of type 6 for the 5GMM protocol", 3GPP TSG-CT WG1 Meeting #136-e, C1-223767 dated May 12, 2022.

* cited by examiner

*Primary Examiner* — Emmanuel L Moise
*Assistant Examiner* — Xiang Yu
(74) *Attorney, Agent, or Firm* — Sheppard, Mullin, Richter & Hampton LLP

(57) ABSTRACT

Disclosed are a communication method and a communications apparatus. The communication method includes: receiving, by a first device, a NAS message transmitted by a second device, where the NAS message includes a first IE, the first IE includes a first IEI, and the first IE carries a second IE. In embodiments of this application, a first IE carries a second IE.

11 Claims, 5 Drawing Sheets

8 7 6 5 4 3 2 1

LI

V

Byte n

Byte n+1

Byte n+2

Byte n+k

COMMUNICATION METHOD AND COMMUNICATIONS APPARATUS

CROSS-REFERENCE TO RELATED APPLICATIONS

This application is a continuation of International Application No. PCT/CN2022/102841, filed on Jun. 30, 2022, the disclosure of which is hereby incorporated by reference in its entirety.

TECHNICAL FIELD

This application relates to the field of communications technologies, and more specifically, to a communication method and a communications apparatus.

BACKGROUND

After accessing a core network, a terminal device can exchange a non-access stratum (NAS) message with a core network device. The NAS message may include a plurality of information elements (IE) to indicate some features, for example, may include an extended protocol discriminator IE, a security header type IE, a packet data unit (PDU) session status IE, and the like. In some cases, a type of an IE may be identified by an information element identifier (IEI). For example, when a hexadecimal value of the IEI is 50, it may indicate that the type of the IE is a PDU session status IE.

With rapid development of a communications system, some new features may be introduced, resulting in an increasing quantity of IEs carried in a NAS message. Consequently, current IEIs may be insufficient. Therefore, how to extend the IEIs is an urgent problem to be resolved.

SUMMARY

This application provides a communication method and a communications apparatus. The following describes the aspects involved in this application.

According to a first aspect, a communication method is provided, including: receiving, by a first device, a non-access stratum NAS message transmitted by a second device, where the NAS message includes a first information element IE, the first IE includes a first information element identifier IEI, and the first IE carries a second IE.

According to a second aspect, a communication method is provided, including: transmitting, by a second device, a non-access stratum NAS message to a first device, where the NAS message includes a first information element IE, the first IE includes a first information element identifier IEI, and the first IE carries a second IE.

According to a third aspect, a communications apparatus is provided, where the apparatus is applied to a first device, and the apparatus includes a processing module and a receiving module. The processing module is configured to receive, by using the receiving module, a non-access stratum NAS message transmitted by a second device, where the NAS message includes a first information element IE, the first IE includes a first information element identifier IEI, and the first IE carries a second IE.

According to a fourth aspect, a communications apparatus is provided, where the apparatus is applied to a second device, and the apparatus includes a processing module and a transmitting module. The processing module is configured to transmit a non-access stratum NAS message to a first device by using the transmitting module, where the NAS message includes a first information element IE, the first IE includes a first information element identifier IEI, and the first IE carries a second IE.

According to a fifth aspect, a first device is provided, including a processor, a memory, and a communications interface. The memory is configured to store one or more computer programs, and the processor is configured to invoke the computer program in the memory, to cause the first device to execute some or all of the steps in the method according to the first aspect.

According to a sixth aspect, a second device is provided, including a processor, a memory, and a communications interface. The memory is configured to store one or more computer programs, and the processor is configured to invoke the computer program in the memory, to cause the second device to execute some or all of the steps in the method according to the second aspect.

According to a seventh aspect, an embodiment of this application provides a communications system, where the system includes the foregoing first device and/or the foregoing second device. In another possible design, the system may further include another device that interacts with the first device or the second device in the solutions provided in embodiments of this application.

According to an eighth aspect, an embodiment of this application provides a computer-readable storage medium. The computer-readable storage medium stores a computer program, and the computer program causes a first device or a second device to execute some or all of the steps in the methods according to the foregoing aspects.

According to a ninth aspect, an embodiment of this application provides a computer program product. The computer program product includes a non-transitory computer-readable storage medium that stores a computer program, and the computer program is operable to cause a first device or a second device to execute some or all of the steps in the methods according to the foregoing aspects. In some implementations, the computer program product may be a software installation package.

According to a tenth aspect, an embodiment of this application provides a chip, where the chip includes a memory and a processor, and the processor may invoke a computer program from the memory and run the computer program, to implement some or all of the steps in the methods according to the foregoing aspects.

DESCRIPTION OF EMBODIMENTS

The following describes the technical solutions in this application with reference to the accompanying drawings.

Technical solutions of embodiments of this application may be applied to various communications systems, such as a 5th generation (5G) system or a new radio (NR) system, a long-term evolution (LTE) system, an LTE frequency division duplex (FDD) system, and an LTE time division duplex (TDD) system. The technical solutions provided in this application may be further applied to a future communications system, such as a 6th generation mobile communications system or a satellite communications system.

First, a network architecture applicable to this application is briefly described.

Figures 1, 2:
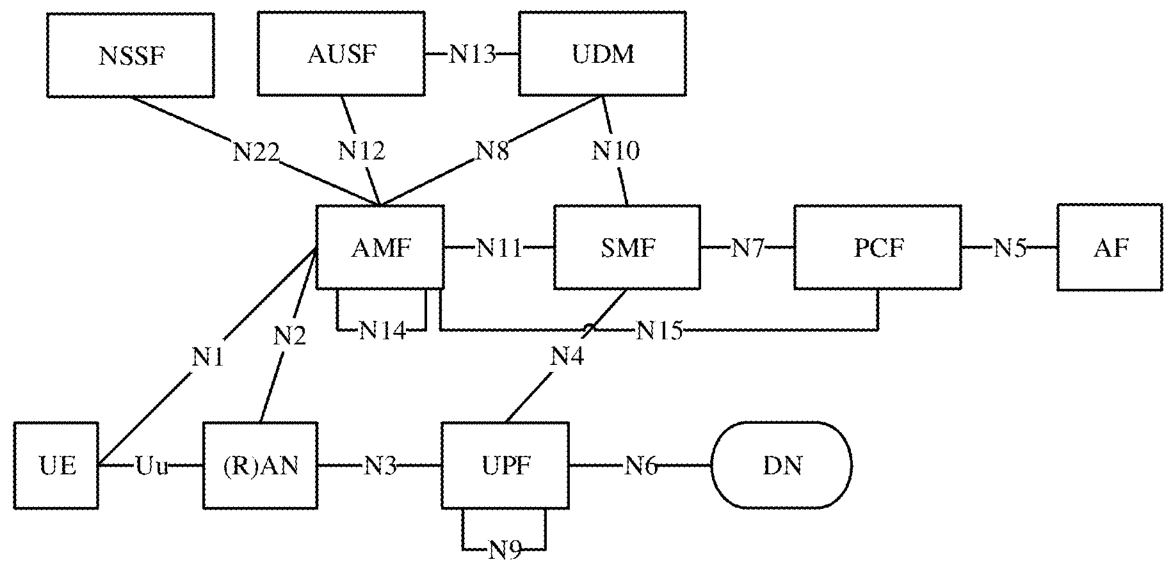
FIG. 1 is an example diagram of a network architecture that may be applied to embodiments of this application.
FIG. 2 is an example diagram of an encoding scheme of an IE.

As an example, FIG. 1 is an example diagram of a network architecture. A 5G system is used as an example of the network architecture shown in FIG. 1. The network architecture may include three parts, which are respectively a terminal device part, a data network (DN) part, and an operator network part. The operator network may include one or more of the following functional entities: an access network (AN) device, a user plane function (UPF) entity, an access and mobility management function (AMF) entity, a session management function (SMF) entity, a policy control function (PCF) entity, an application function (AF) entity, a network slice selection function (NSSF) entity, an authentication server function (AUSF) entity, or a unified data management (UDM) entity. In the foregoing operator network, a part other than the access network device part may be referred to as a core network part, and a functional entity of the core network part may be referred to as a core network device.

The following provides examples to describe functions of parts or functional entities involved in the network architecture in the 5G network.

Terminal device: The terminal device may also be referred to as a user equipment (UE), an access terminal, a subscriber unit, a subscriber station, a mobile site, a mobile station (MS), a mobile terminal (MT), a remote station, a remote terminal, a mobile device, a user terminal, a terminal, a wireless communications device, a user agent, or a user apparatus. The terminal device in embodiments of this application may be a device providing a user with voice and/or data connectivity and capable of connecting people, objects, and machines, such as a handheld device or a vehicle-mounted device having a wireless connection function. The terminal device in embodiments of this application may be a mobile phone (mobile phone), a tablet computer (Pad), a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, or the like. Optionally, the UE may be configured to function as a base station. For example, the UE may function as a scheduling entity, which provides a sidelink signal between UEs in V2X, D2D, or the like. For example, a cellular phone and a vehicle communicate with each other by using a sidelink signal. A cellular phone and a smart home device communicate with each other, without relaying a communication signal by using a base station.

Access network device: The access network device may be configured to provide a network access function for an authorized terminal device in a specific area, and can use transmission channels of different quality according to a level, a service requirement, and the like of the terminal device. The access network device can manage a wireless resource, and provide an access service for the terminal device, to complete forwarding of a control signal and data between the terminal device and a core network.

The access network device may be a device in a wireless network. The access network device may also be referred to as a radio access network (RAN) device or a network device. For example, the access network device may be a base station. The access network device in embodiments of this application may refer to a radio access network (RAN) node (or device) that connects the terminal device to a wireless network. The base station may broadly cover various names in the following, or may be replaced with the following names: a NodeB, an evolved NodeB (eNB), a next generation NodeB (gNB), a relay station, an access point, a transmitting and receiving point (TRP), a transmitting point (TP), a primary MeNB, a secondary SeNB, a multi-standard radio (MSR) node, a home base station, a network controller, an access node, a wireless node, an access point (AP), a transmission node, a transceiver node, a baseband unit (BBU), a remote radio unit (RRU), an active antenna unit (AAU), a remote radio head (RRH), a central unit (CU), a distributed unit (DU), a positioning node, or the like. The base station may be a macro base station, a micro base station, a relay node, a donor node, or the like, or a combination thereof. Alternatively, the base station may refer to a communications module, a modem, or a chip disposed in the foregoing device or apparatus. Alternatively, the base station may be a mobile switching center, a device that functions as a base station in device-to-device (D2D), vehicle-to-everything (V2X), and machine-to-machine (M2M) communications, a network-side device in a 6G network, a device that functions as a base station in a future communications system, or the like. The base station may support networks of a same access technology or different access technologies. A specific technology and a specific device form used by the access network device are not limited in embodiments of this application.

The base station may be fixed or mobile. For example, a helicopter or an unmanned aerial vehicle may be configured to function as a mobile base station, and one or more cells may move depending on a location of the mobile base station. In other examples, a helicopter or an unmanned aerial vehicle may be configured to function as a device in communication with another base station.

In some deployments, the access network device in embodiments of this application may be a CU or a DU, or the access network device includes a CU and a DU. A gNB may further include an AAU.

The access network device and the terminal device may be deployed on land, including being indoors or outdoors, handheld, or vehicle-mounted, may be deployed on a water surface, or may be deployed on a plane, a balloon, or a satellite in the air. In embodiments of this application, a scenario in which the access network device and the terminal device are located is not limited.

UPF entity: The UPF is a user plane function in the core network, and may be responsible for forwarding and receiving of user data (for example, a service data flow) in the terminal device. For example, the UPF may receive user data from the DN, and transmit the user data to the terminal device by using the access network device. Alternatively, the UPF may receive user data from the terminal device by using the access network device, and then forward the user data to the DN. A transmission resource and a scheduling function in the UPF that provide a service for the terminal device are managed and controlled by the SMF. In some embodiments, the UPF may be divided into an intermediate UPF (intermediate-UPF, I-UPF) and an anchor UPF (anchor-UPF, A-UPF). The I-UPF is connected to an access network, the A-UPF is a UPF of a session anchor, and the A-UPF may also be referred to as a PDU session anchor (PSA).

AMF entity: The AMF is a mobility management function in the core network, and may be configured to implement functions other than session management in functions of a mobility management entity (MME), such as lawful interception or access authorization (or authentication). In some embodiments, in addition to performing mobility management on the terminal device, the AMF may be further responsible for forwarding of a message related to session management between the terminal device and the SMF.

SMF entity: The SMF is a session management function in the core network, and is mainly responsible for session management, internet protocol (IP) address allocation and management of the terminal device, selection of a manageable user plane function, policy control, a termination point of a charging function interface, downstream data notification, and configuration of routing information for a user plane function.

PCF entity: The PCF is a policy management function in the core network, and may be responsible for formulation of policies related to mobility management, session management, charging, and the like of the terminal device. Specifically, the PCF may provide policy rule information and the like for a functional entity (for example, the AMF entity or the SMF entity) on a control plane, to manage and control mobility management, session management, and the like of the terminal device.

AF entity: The AF mainly supports interaction with a 3rd generation partnership project (3rd generation partnership project, 3GPP) core network to provide services, for example, affecting a data routing decision, a policy control function, or providing a network side with some services of a third party. In other words, the AF may be mainly configured to transfer a requirement of an application side on the network side. In some embodiments, the AF may be understood as a third-party server, for example, an application server on an internet, which provides related service information, including providing the PCF with service quality requirement information corresponding to a service, and transmitting user plane data information of a service to an A-UPF. In some embodiments, the AF may also be a content provider (CP).

DN: The DN refers to a network that may be used to provide transmission data. The DN may be a private network, for example, a local area network, or may be an external network that is not managed or controlled by an operator, for example, an internet, or may be a dedicated network jointly deployed with an operator, for example, a network that provides an IP multimedia core network subsystem (IMS) service.

It should be understood that the foregoing functional entities in the core network may also be referred to as network elements, which is not limited in this application. For example, the UPF entity may also be referred to as a UPF network element, and the AMF entity may also be referred to as an AMF network element.

It should also be understood that in some embodiments, the xx functional entity or the xx network element may also be directly referred to as the xx, for example, the UPF entity (or the UPF network element) may be referred to as the UPF, and the AMF entity (or the AMF network element) may be referred to as the AMF. For ease of description, the xx (for example, the UPF or the AMF) mentioned in embodiments of this application may refer to the xx entity or the xx network element. Details are not described again in the following.

In the network architecture shown in FIG. 1, the parts or functional entities may communicate with each other by using interfaces. For example, the terminal device may perform an access stratum (AS) connection to the AN by using a Uu interface, and exchange transmission of an AS message and wireless data. The terminal device may perform a non-access stratum (NAS) connection to the AMF by using an N1 interface, and exchange a NAS message. The AN may be connected to the AMF by using an N2 interface, to transfer radio bearer control information from the core network side to the AN. The UPF may perform data transmission with the AN by using an N3 interface, and perform data transmission with the DN by using an N6 interface, and the like. For interfaces used to connect other parts or functional entities, refer to FIG. 1. Details are not described herein again.

It should be understood that the foregoing network architecture is merely an example for description, and a network architecture applicable to embodiments of this application is not limited thereto. Any network architecture that can implement the functions of the foregoing functional entities is applicable to embodiments of this application.

It should be understood that the access network device, the AMF, the SMF, the UPF, the PCF, and the like shown in FIG. 1 are merely names, and the names do not constitute any limitation on the devices. In a 5G network and another network in the future, entities corresponding to the access network device, the AMF, the SMF, the UPF, the PCF, and the like may also be other names. This is not specifically limited in embodiments of this application.

It should be understood that the names of the interfaces between the functional entities shown in FIG. 1 are merely examples. In specific implementations, the names of the interfaces between the functional entities may also be other names, for example, names of interfaces between functional entities in a 6G network. This is not specifically limited in embodiments of this application.

It should be understood that all or some of functions of a communications device in this application may also be implemented by software functions running on hardware, or by virtualization functions instantiated on a platform (for example, a cloud platform).

It should be understood that the system architecture described in embodiments of this application is intended to describe the technical solutions in embodiments of this application more clearly, and does not constitute any limitation on the technical solutions provided in embodiments of this application. It may be learned by a person skilled in the art that, with evolution of a network architecture, embodiments of this application may also be applicable to similar technical problems.

After the terminal device accesses the core network by using the access network device (for example, a base station), the terminal device can communicate with the core network device. In a process in which the terminal device accesses the core network by using the access network device, communication between the terminal device and the access network device may be understood as AS interaction, which may implement communication between the terminal device and the access network device by transmitting and receiving an AS message. Communication between the terminal device and the core network device may be understood as NAS interaction, which may implement communication between the terminal device and the core network device by transmitting and receiving a NAS message. For example, in a process in which the terminal device initiates NAS registration to the core network device, the terminal device may transmit a registration request message to the core network device. If the core network device can accept the registration request message of the terminal device, the core network device may return a registration accept message to the terminal device. Both the registration request message and the registration accept message may be understood as NAS messages, and are used for communication between the terminal device and the core network device.

In an implementation, the NAS message between the terminal device and the core network device may be forwarded by the access network device through transparent transmission.

The NAS message may include a plurality of information elements (IE) to indicate some features (feature). In some embodiments, the information elements may also be referred to as information elements, information elements, or the like. This is not limited in this application. For example, the NAS message may include an extended protocol discriminator IE, where the extended protocol discriminator may be used to indicate whether the NAS message is a 5GMM message or a 5GSM message. Alternatively, the NAS message may include a security header type IE, where the IE may be used to indicate a feature related to security protection of a 5G mobility management (5GMM) message, for example, control information related to security protection of the 5GMM message. Alternatively, the NAS message may include a packet data unit (PDU) session status IE, a PDU session reactivation result IE, a PDU session reactivation result error cause IE, and the like. These IEs may be used to indicate a feature related to a PDU session, and the like.

Among the plurality of IEs included in the NAS message, some IEs are mandatory IEs for the NAS message, and some IEs are optional IEs for the NAS message. For example, the extended protocol discriminator IE and the security header type IE mentioned above may be mandatory IEs for the NAS message, while the PDU session status IE, the PDU session reactivation result IE, and the like may be optional IEs for the NAS message. This is not limited in embodiments of this application.

Among the plurality of IEs included in the NAS message, a type of each IE may be different. The type of the IE may be used to indicate a function or purpose of the IE. For example, an IE type corresponding to the extended protocol discriminator IE mentioned above is an extended protocol discriminator IE, an IE type corresponding to the security header type IE is a security header type IE, and an IE type corresponding to the PDU session status IE is a PDU session status IE.

The IEs may be encoded in different formats (format). In an implementation, an IE may be encoded in a format V, where V represents a value, which indicates an actual value of the IE. In another implementation, an IE may be encoded in a format LV or a format LV-E, where L represents a length, which indicates length information of a value; V represents a value, which indicates an actual value of the IE; and LV-E refers to an extended LV format. In still another implementation, an IE may be encoded in a format TLV or a format TLV-E, where T represents a type, which indicates a type of the IE; L represents a length, which indicates length information of a value; V represents a value, which indicates an actual value of the IE; and TLV-E refers to an extended TLV format.

It may be learned that when an IE is encoded in the format TLV or TLV-E, T (type) is used to identify a type of the IE. In some embodiments, the type of the IE may be determined (or identified) by using an information element identifier (IEI). For example, a hexadecimal representation method is used. When a value of the IEI is 50, it may indicate that the type of the IE is a PDU session status IE; when a value of the IEI is 26, it may indicate that the type of the IE is a PDU session reactivation result IE; when a value of the IEI is 72, it indicates that the type of the IE is a PDU session reactivation result error cause IE. However, in this application, it is not limited that when the format TLV or TLV-E is used for encoding, all IEs need to use the IEI to identify the type of the IE. For example, some mandatory IEs in the NAS message may not be identified by the IEI. For example, mandatory IEs such as the extended protocol discriminator IE and the security header type IE may not be identified by the IEI.

In some embodiments, an IE corresponding to L may be divided into an IE of a type 4 and an IE of a type 6 according to a length of L (a size of bytes occupied by L). Specifically, when the length of L is always represented by one octet, this type of IE may be referred to as an IE of a type 4; when the length of L is always represented by two octets, this type of IE may be referred to as an IE of a type 6.

Figure 3:
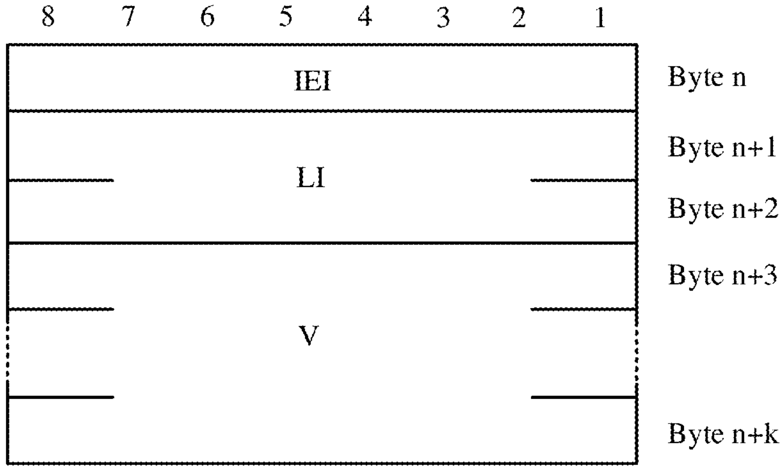
FIG. 3 is another example diagram of an encoding scheme of an IE.

An IE of a type 6 may be encoded in the format LV-E or the format TLV-E. For details, refer to schematic diagrams of an IE of a type 6 shown in FIG. 2 and FIG. 3. FIG. 2 is an IE of a type 6 encoded in the format LV-E, and FIG. 3 is an IE of a type 6 encoded in the format TLV-E. In the examples of FIG. 2 and FIG. 3, length information of L of the IE of the type 6 is identified by LI (length information). It may be learned that a length of L of the IE of the type 6 is fixed and is represented by two octets, and the LI is located in front of V during encoding, where the length of V may be, for example, any value in 0 to 65535 octets. If the format TLV-E is used for encoding, an IEI used to identify the type of the IE is located in front of the LI, and is represented by one octet.

As described above, the IEI may be used to identify the type of the IE. Currently, the IEI is represented by one octet, but a quantity of IEIs that can be represented by the one octet is limited. With rapid development of a communications system, some new features may be introduced constantly. For example, some new features may be introduced into a 5G system, a 6G system, or a future communications system. These new features may be carried by new IEs. In this case, an increasing quantity of IEs may be carried in a NAS message, and consequently, current IEIs may be insufficient.

The IE of the type 6 is used as an example. In 5G system protocols 5GMM and 5GSM, it is specified that in one octet used to represent an IEI, a bit 8 is set to 0 and a bit 7 to a bit 5 are set to 1, which indicates that the IE identified by the IEI is encoded in the format TLV-E and is an IE of a type 6. That is, two bytes after one byte of the IEI are bytes used to represent L (Bit 8 of the IEI octet set to "0" and bits 7 to 5 set to "1" indicates a TLV-E formatted type 6 IE, i.e. the following two octets are length octets). That is, a value of the IEI is 0111xxxx (represented as 70 to 7F in hexadecimal), which indicates that a format of the IE is TLV-E, the IE is an IE of a type 6, and a length of the IE is two octets. It may be learned that the IEI used to identify the IE of the type 6 has only 16 values (70 to 7F). As new features are added, a value range of the IEI is likely to be insufficient.

With reference to Table 1, the following provides an example of a NAS message to exemplify that IEIs for the type 6 may be insufficient.

TABLE 1

| IEI | IE | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | Registration accept message identity | Message type 9.7 | M | V | 1 |
| | 5GS registration result | 5GS registration result 9.11.3.6 | M | LV | 2 |
| 77 | 5G globally unique temporary identity (5G-GUTI) | 5GS mobile identity 9.11.3.4 | O | TLV-E | 14 |
| 4A | Equivalent public land mobile networks (Equivalent PLMNs) | PLMN list 9.11.3.45 | O | TLV | 5-47 |
| 54 | Tracking area identity list | 5GS tracking area identity list 9.11.3.9 | O | TLV | 9-114 |
| 15 | Allowed network slice selection assistance information (Allowed NSSAI) | NSSAI 9.11.3.37 | O | TLV | 4-74 |
| 11 | Rejected NSSAI | Rejected NSSAI 9.11.3.46 | O | TLV | 4-42 |
| 31 | Configured NSSAI | NSSAI 9.11.3.37 | O | TLV | 4-146 |
| 21 | 5GS network feature support | 5GS network feature support 9.11.3.5 | O | TLV | 3-5 |
| 50 | PDU session status | PDU session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result error cause 9.11.3.43 | O | TLV-E | 5-515 |
| 79 | Local area data network (LADN) information | LADN information 9.11.3.30 | O | TLV-E | 12-1715 |
| B- | Mobile initiated connection only (MICO) indication | MICO indication 9.11.3.31 | O | TV | 1 |
| 9- | Network slicing indication | Network slicing indication 9.11.3.36 | O | TV | 1 |
| 27 | Service area | Service area list 9.11.3.49 | O | TLV | 6-114 |
| 5E | T3512 value | GPRS timer 3 9.11.2.5 | O | TLV | 3 |
| 5D | Non-3GPP de-registration timer value | GPRS timer 2 9.11.2.4 | O | TLV | 3 |
| 16 | T3502 value | GPRS timer 2 9.11.2.4 | O | TLV | 3 |
| 34 | Emergency number list | Emergency number list 9.11.3.23 | O | TLV | 5-50 |
| 7A | Extended emergency number list | Extended emergency number list 9.11.3.26 | O | TLV-E | 7-65538 |
| 73 | Service operation request (SOR) transparent container | SOR transparent container 9.11.3.51 | O | TLV-E | 20-n |
| 78 | Extensible authentication protocol (EAP) message | EAP message 9.11.2.2 | O | TLV-E | 7-1503 |
| A- | NSSAI inclusion mode | NSSAI inclusion mode 9.11.3.37A | O | TV | 1 |
| 76 | Operator-defined access category definitions | Operator-defined access category definitions 9.11.3.38 | O | TLV-E | 3-8323 |

TABLE 1-continued

| IEI | IE | Type/Reference | Presence | Format | Length |
|---|---|---|---|---|---|
| 51 | Negotiated discontinuous reception (DRX) parameters | 5GS DRX parameters 9.11.3.2A | O | TLV | 3 |
| D- | Non-3GPP network policies | Non-3GPP network provided policies 9.11.3.36A | O | TV | 1 |
| 60 | Evolved packet system (EPS) bearer context status | EPS bearer context status 9.11.3.23A | O | TLV | 4 |
| 6E | Negotiated extended DRX parameters | Extended DRX parameters 9.11.3.26A | O | TLV | 3 |
| 6C | T3447 value | GPRS timer 3 9.11.2.5 | O | TLV | 3 |
| 6B | T3448 value | GPRS timer 2 9.11.2.4 | O | TLV | 3 |
| 6A | T3324 value | GPRS timer 3 9.11.2.5 | O | TLV | 3 |
| 67 | UE radio capability ID | UE radio capability ID 9.11.3.68 | O | TLV | 3-n |
| E- | UE radio capability ID deletion indication | UE radio capability ID deletion indication 9.11.3.69 | O | TV | 1 |
| 39 | Pending (Pending) NSSAI | NSSAI 9.11.3.37 | O | TLV | 4-146 |
| 74 | Ciphering key data | Ciphering key data 9.11.3.18C | O | TLV-E | 34-n |
| 75 | Closed access group (CAG) information list | CAG information list 9.11.3.18A | O | TLV-E | 3-n |
| 1B | Truncated 5G-service-temporary mobile subscriber identity (5G-S-TMSI) configuration | Truncated 5G-S-TMSI configuration 9.11.3.70 | O | TLV | 3 |
| 1C | Negotiated wake up signal (WUS) assistance information | WUS assistance information 9.11.3.71 | O | TLV | 3-n |
| 29 | Negotiated NB-N1 mode DRX parameters | NB-N1 mode DRX parameters9.11.3.73 | O | TLV | 3 |
| 68 | Extended rejected NSSAI | Extended rejected NSSAI 9.11.3.75 | O | TLV | 5-90 |
| 7B | Service-level-AA container | Service-level-AA container 9.11.2.10 | O | TLV-E | 6-n |
| 33 | Negotiated PEIPS assistance information | PEIPS assistance information 9.11.3.80 | O | TLV | 3-n |
| 34 | 5GS additional request result | 5GS additional request result 9.11.3.81 | O | TLV | 3 |
| 70 | NSSRG information | NSSRG information 9.11.3.82 | O | TLV-E | 7-65538 |
| 14 | Disaster roaming wait range | Disaster roaming wait range 9.11.3.84 | O | TLV | 4 |
| 2C | Disaster return wait range | Disaster return wait range 9.11.3.84 | O | TLV | 4 |
| 13 | List of PLMNs to be used in disaster condition | List of PLMNs to be used in disaster condition 9.11.3.83 | O | TLV | 2-n |
| 1D | Forbidden tracking area identities for the list of "5GS forbidden tracking areas for roaming" (Forbidden TAI(s) for the list of "5GS forbidden tracking areas for roaming") | 5GS tracking area identity list 9.11.3.9 | O | TLV | 9-114 |
| 1E | Forbidden tracking area identities for the list of "5GS forbidden tracking areas for regional provision of service" (Forbidden TAI(s) for the list of "5GS forbidden tracking areas for regional provision of service") | 5GS tracking area identity list 9.11.3.9 | O | TLV | 9-114 |
| 71 | CAG information list | Extended CAG information list 9.11.3.86 | O | TLV-E | 3-n |

Table 1 uses an example in which a NAS message is a registration accept message, where the registration accept message is transmitted by a core network device to a terminal device. The registration accept message contains many IEs, where each row in Table 1 represents one IE.

Among these IEs, some are mandatory (represented by M (mandatory)) and some are optional (represented by O (optional)).

Among these IEs, some IEs do not need to be identified by IEIs, for example, IEs that must exist in the registration accept message. Some IEs need to be identified by IEIs, for example, IEs that may exist or may not exist in the registration accept message, and different IEIs are used to indicate different types of IEs. For example, if a value of an IEI is 70, it indicates that a type of the IE is an NSSRG information IE. If a value of an IEI is 7A, it indicates that a type of the IE is an extended emergency number list IE.

These IEs may be encoded in a same format or in different formats. For example, some IEs may be encoded in a format V, for example, an extended protocol discriminator IE. Some IEs may be encoded in a format TLV, for example, a PDU session status IE. Some IEs may be encoded in TLV-E, for example, an extended emergency number list IE.

Value ranges of lengths of these IEs may be different, where a length of an IE refers to a size of bytes occupied by the entire IE. For example, when the IE is encoded in a format LV-E, the length of the IE includes a size of bytes occupied by two parts: L (length) and V (value). When the IE is encoded in the format TLV-E, the length of the IE includes a size of bytes occupied by the following parts: IEI, L, and V.

It may be seen from the example in Table 1 that, in this registration accept message, IEIs (70 to 7F in hexadecimal) for a type 6 are basically used up. If new IEs need to be represented by the IEIs of the type 6, values of the IEIs of the type 6 are already insufficient. Therefore, how to extend the IEIs is an urgent problem to be resolved.

In a possible implementation, the IEIs may be extended by extending a range of IEI values. Specifically, a length of an IEI may be extended. For example, currently the length of the IEI is represented by one octet. The length of the IEI may be extended to be represented by two octets, or may be extended to be represented by more bytes. However, to support such a solution, on the one hand, a terminal device needs to indicate, to a network side (a core network device), that the terminal device supports extended IEIs. For example, the terminal device needs to perform capability indication reporting, to indicate that the terminal device supports extended IEIs. This causes a complicated change to an implementation of the terminal device. On the other hand, when transmitting a NAS message to the terminal device, the network side further needs to check a capability of the terminal device and generate NAS message content according to different capabilities of the terminal device. This undoubtedly increases complexity of an implementation of the network side.

Based on this, embodiments of this application provide a communication method and a communications apparatus, which can resolve the problem of insufficient IEIs. In addition, compared with the solution of extending the length of the IEI, the technical solutions in embodiments of this application do not require a terminal device to perform capability reporting, so that a change to an implementation of the terminal device is relatively small, and complexity of an implementation of a network side is also relatively low.

Before embodiments of this application are described, a communications system to which embodiments of this application are applicable is first described.

Figure 4:
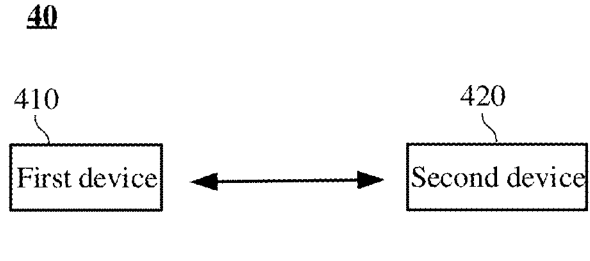
FIG. 4 is an example diagram of a communications system that may be applied to embodiments of this application.

FIG. 4 is a communications system 40 according to an embodiment of this application. The communications system 40 includes a first device 410 and a second device 420.

The first device 410 and the second device 420 may communicate with each other and exchange a NAS message. For example, the first device 410 may transmit a NAS message to the second device 420, and the second device 420 may receive the NAS message transmitted by the first device 410 to perform subsequent processing. Alternatively, the second device 420 may transmit a NAS message to the first device 410, and the first device 410 may receive the NAS message transmitted by the second device 420 to perform subsequent processing.

That the first device 410 and the second device 420 communicate with each other and exchange a NAS message may refer to: the first device and the second device directly communicate with each other and exchange a NAS message; or may refer to: the first device and the second device communicate with each other and exchange a NAS message through forwarding of another device, for example, may communicate with each other through transparent transmission of the another device. This is not specifically limited in embodiments of this application.

In the communications system provided in this embodiment of this application, the first device 410 may be a terminal device, and the second device 420 may be a core network device. Alternatively, the first device may be a core network device, and the second device may be a terminal device. This is not limited in embodiments of this application, provided that a NAS message may be exchanged between the first device and the second device. The terminal device may be any terminal device mentioned above, and the core network device may be a device located in a core network, for example, the AMF, the SMF, or the PCF mentioned above. This is not limited in embodiments of this application.

Optionally, the communications system provided in this embodiment of this application may be applied to the network architecture shown in FIG. 1, which is not limited in embodiments of this application. For example, if the communications system provided in this embodiment of this application is applied to the network architecture shown in FIG. 1, the first device may be a terminal device and the second device may be an AMF in a core network. Alternatively, the first device may be an AMF in a core network and the second device may be a terminal device, or the like.

With reference to FIG. 5 to FIG. 8, the following describes in detail a wireless communication method provided in embodiments of this application.

Figure 5:
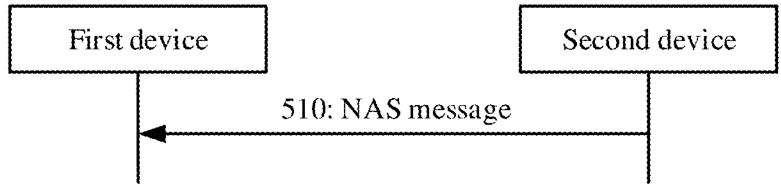
FIG. 5 is a schematic flowchart of a communication method according to an embodiment of this application.

FIG. 5 is a schematic flowchart of a communication method according to an embodiment of this application. The method shown in FIG. 5 is described from a perspective of interaction between a first device and a second device. The first device and the second device may be, for example, the first device 410 and the second device 420 in FIG. 4. For example, the first device may be a terminal device, and the second device is a core network device. Alternatively, the first device may be a core network device, and the second device is a terminal device. The communication method provided in this embodiment of this application may include step S510. The following describes this step in detail.

In step S510, the second device transmits a NAS message to the first device.

In an implementation, the second device may directly transmit the NAS message to the first device. In another implementation, the second device may transmit the NAS message to the first device through forwarding of another device. A 5G system is used as an example. It is assumed that the first device and the second device are respectively a terminal device and an AMF, and the second device may directly transmit the NAS message to the first device by using an N1 interface. Alternatively, the second device may transmit the NAS message to the first device through forwarding of an access network device (for example, a base station), where the access network device may forward the NAS message through transparent transmission.

The NAS message may include a plurality of types. For example, the NAS message may be a registration request message, a registration accept message, or the like. That the NAS message is a registration request message is used as an example. The second device may be a terminal device and the first device may be a core network device. That the NAS message is a registration accept message is used as an example. The second device may be a core network device and the first device may be a terminal device. Certainly, the NAS message may also be another NAS message such as a registration reject message, which is not limited in embodiments of this application.

The NAS message may include a first IE. In some embodiments, the first IE may be an optional IE, that is, presence of the first IE is optional. That is, some NAS messages may include the first IE, and some NAS messages may not include the first IE. For example, the first device and the second device may exchange a plurality of NAS messages, which include, for example, a NAS message #1 and a NAS message #2. The NAS message #1 may include the first IE, and the NAS message #2 may not include the first IE. This is not limited in embodiments of this application.

A value range of a length of the first IE is not limited in embodiments of this application. For example, when the first IE is an IE encoded in a format TLV or TLV-E, the length of the first IE may be 3-n octets, where n is any value greater than or equal to 3 and less than or equal to 65535.

The first IE may include a first IEI, where the first IEI may be used to indicate a type (type, T) of the first IE. The type of the first IE may be used to indicate a function or purpose of the first IE. For example, when the function of the first IE is to carry another IE as a container, the type of the first IE may be understood as a NAS message container, or may be understood as an IE container. Table 2 provides an example in which a NAS message includes a first IE. As shown in Table 2, a type of the first IE is a NAS message container, and the first IE is an optional IE.

TABLE 2

| IEI | IE | Type/Reference | Presence | Format | Length |
|---|---|---|---|---|---|
| First IEI | First IE | NAS message container | O | TLV-E | 3-n |

Table 3 provides another example in which a NAS message includes a first IE. As shown in Table 3, a type of the first IE is an extended type 6 IE container, and the first IE is an optional IE.

TABLE 3

| IEI | IE | Type/Reference | Presence | Format | Length |
|---|---|---|---|---|---|
| First IEI | First IE | Extended type 6 IE container | O | TLV-E | 3-n |

In a case in which the first IE includes a first IEI, it may be considered that the first IE is encoded in a format TLV or TLV-E. When the first IE is encoded in the format TLV or TLV-E, in addition to the first IEI, the first IE may further include other parts or fields, for example, includes a first length (L), a first value (V), and the like. The first value part is used to indicate actual content or an actual value of the first IE, and the first length is used to indicate length information of the first value.

Figure 6:
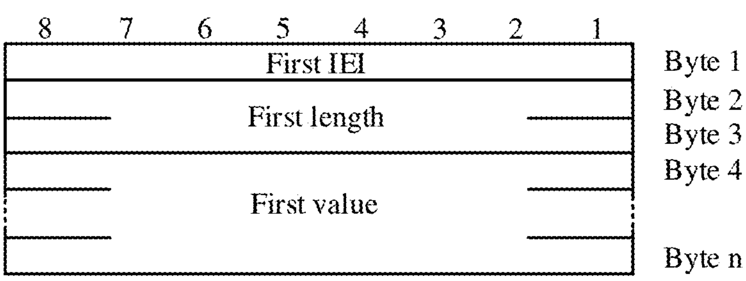
FIG. 6 is an example diagram of an encoding scheme of a first IE according to an embodiment of this application.

When the first IE is encoded in the format TLV or TLV-E, a length of the first IEI and/or the first length may be fixed, where the length of the first IEI or the first length may refer to a size of bytes occupied by the first IEI or the first length. That is, the length of the first IEI and/or the first length may be represented by a fixed byte size. For example, the first IEI may be represented by one octet, and the first length may be represented by one octet or two octets. A length of the first value may vary. For example, when the first length is represented by two octets, the length of the first value may be any value in 0 to 65535 octets, and the length of the first value may be specified by the first length. FIG. 6 is an example of an encoding scheme of a first IE according to an embodiment of this application. As shown in FIG. 6, the first IE includes a first IEI, a first length, and a first value. The first IEI is represented by one octet (refer to a byte 1 shown in FIG. 6), the first length is represented by two octets (refer to a byte 2 and a byte 3 shown in FIG. 6), and the first value may be represented by 0, 1, or more octets (refer to a byte 4 to a byte n shown in FIG. 6).

In some embodiments, in addition to the first IE, the NAS message may further include other IEs that coexist with the first IE. These IEs may be used to indicate other features other than a feature indicated by the first IE. For example, in addition to the first IE, the NAS message may further include mandatory IEs such as an extended protocol discriminator IE and a security header type IE, and may also include optional IEs such as a PDU session status IE and a PDU session reactivation result IE. This is not limited in embodiments of this application.

In some embodiments, the first IE may be an IE of a type 6. However, embodiments of this application are not limited thereto. For example, the first IE may also be an IE of a type 4, or may be another type of IE that appears in a future communications system.

As described above, the first IEI may be used to indicate a type of the first IE. In some embodiments, the first IEI may be used to indicate, for example, that the first IE is a nested IE, that is, the first IE may carry a second IE. The following describes the second IE carried in the first IE.

In some embodiments, the second IE may be an optional IE, that is, presence of the second IE is optional. That is, some NAS messages may include the second IE, and some NAS messages may not include the second IE.

In some embodiments, the second IE may include a second IEI, and in a case in which the second IE includes the second IEI, it may be considered that the second IE is encoded in a format TLV or TLV-E. For specific content of an encoding structure of the second IE, refer to the foregoing related descriptions of the encoding structure of the first IE. For brevity, details are not described herein again.

In some embodiments, a type of the second IE is determined based on the first IEI and the second IEI. It may be understood that the first IEI is used to mark that the first IE is a nested IE, and the second IEI is used to jointly determine the type of the second IE with the first IEI. In this case, the type of the second IE may be uniquely determined with reference to the first IEI and the second IEI. For example, it is stipulated that a value of the first IEI is 80 in hexadecimal (which certainly may be another value and is merely an example herein), and a value of the second IEI is 10 in hexadecimal. In this case, 80-10 may uniquely identify the type of the second IE. For example, the type of the second IE is an IE corresponding to a newly added feature in a 5G system, or may be an IE corresponding to an existing feature in the 5G system. This is not limited in this application.

The first IE may carry one or more second IEs, which is not limited in this application. In a case in which the first IE carries a plurality of second IEs, the plurality of second IEs may be IEs of different types. The plurality of second IEs may respectively include corresponding second IEIs. In this case, for a second IE in the plurality of second IEs, a type of the second IE may be determined based on the first IEI and a second IEI corresponding to the second IE.

In a case in which the first IE carries a second IE, the first IE may also be understood as a container for packaging, that is, the type of the first IE may be understood as a NAS message container or an extended type 6 IE container. The container carries a second IE, for example, carries a plurality of second IEs.

In embodiments of this application, a first IE carries a second IE. In this case, a type of the second IE may be determined based on a first IEI included in the first IE. Compared with a conventional case in which a type of an IE is determined by using only an IEI included in the IE, determining a type of an internal IE based on an IEI of a nested external IE can extend a quantity of IEs identified by IEIs, thereby resolving a problem of insufficient IEIs.

Figure 7:
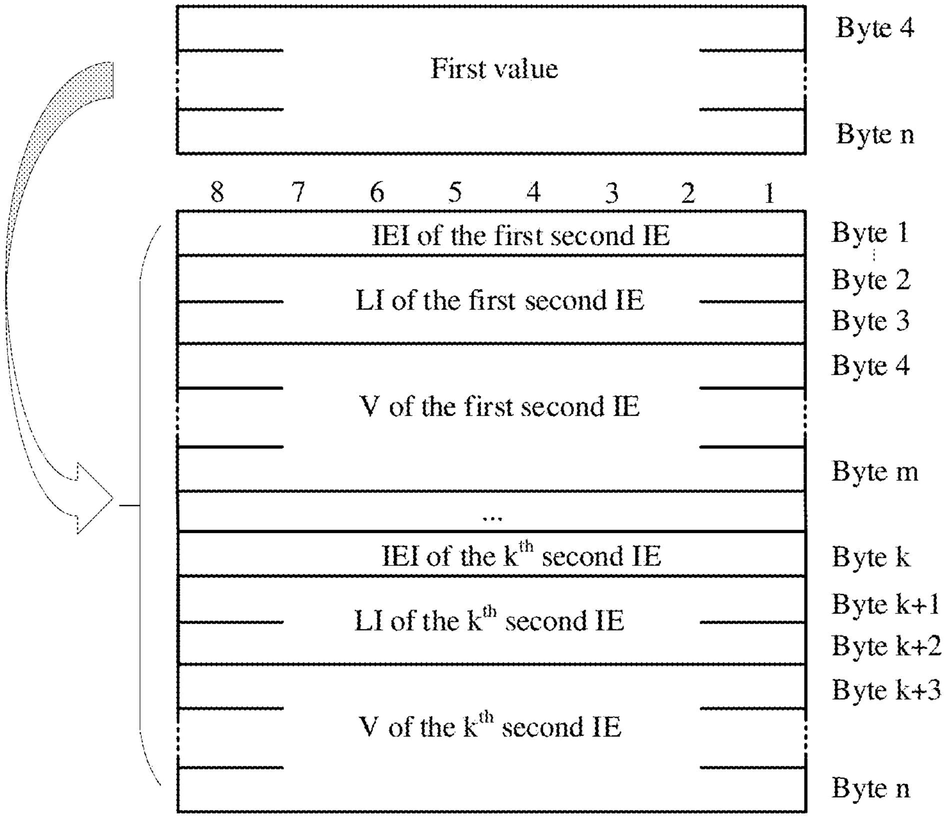
FIG. 7 is an example diagram of an encoding scheme of a first IE according to another embodiment of this application.

In some embodiments, the second IE may be nested in a value part (the first value part) of the first IE, that is, the value part of the first IE may carry the second IE. As shown in FIG. 7, a plurality of second IEs (the first second IE to the $k^{th}$ second IE) are nested in the value part of the first IE. An encoding scheme of each second IE is similar to the encoding scheme of the first IE, that is, each second IE may be encoded in the format TLV or TLV-E. That is, each second IE may include one IEI, for example, an IEI of the first second IE, an IEI of the second second IE, and an IEI of the $k^{th}$ second IE. In this case, the first IEI and the IEI of the first second IE may be used to uniquely identify a type of the first second IE, the first IEI and the IEI of the second second IE may be used to uniquely identify a type of the second second IE, and the like.

Figure 8:
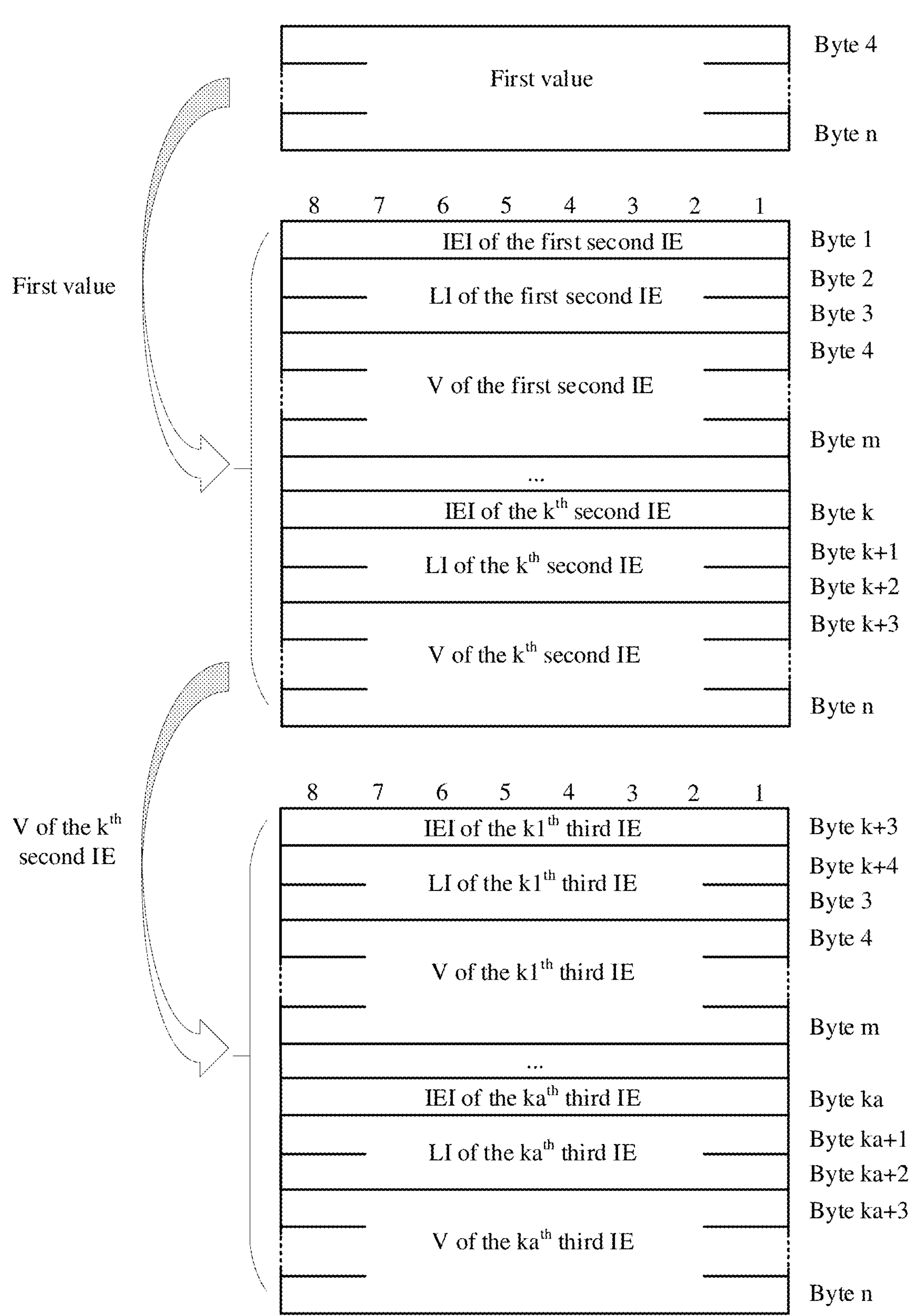
FIG. 8 is an example diagram of an encoding scheme of a first IE according to still another embodiment of this application.

To avoid that a problem of insufficient IEI values cannot be completely resolved in a case in which the first IE carries a second IE, in some embodiments, a third IE may be further nested in the second IE, that is, the second IE further carries the third IE. With reference to FIG. 8, the following describes a case in which a second IE carries a third IE.

As shown in FIG. 8, one or more second IEs (the first second IE to the $k^{th}$ second IE) are carried in the value part (the first value part) of the first IE. Some or all of the one or more second IEs further carry a third IE. For example, a second IE in the one or more second IEs carries a third IE, for example, the first second IE carries a third IE, or the $k^{th}$ second IE carries a third IE. Alternatively, some second IEs in the one or more second IEs carry a third IE, for example, both the first second IE and the $k^{th}$ second IE may carry a third IE.

In some embodiments, a third IE may be nested in a value part of a second IE, that is, the value part of the second IE may carry the third IE. For example, in FIG. 8, the value part (the first value part) of the first IE carries k second IEs, and a value part of the $k^{th}$ second IE carries a third IE.

In some embodiments, the third IE may be an optional IE, that is, presence of the third IE is optional. That is, some NAS messages may include the third IE, and some NAS messages may not include the third IE.

The third IE may include a third IEI, and in a case in which the third IE includes the third IEI, it may be considered that the third IE is encoded in a format TLV or TLV-E. An encoding scheme of the third IE is similar to the encoding scheme of the first IE or that of the second IE. For details, refer to the foregoing related descriptions.

In some embodiments, a type of the third IE is determined based on the first IEI, the second IEI, and the third IEI. The type of the third IE may be uniquely determined with reference to the first IEI, the second IEI, and the third IEI.

The second IE may carry one or more third IEs, which is not limited in this application. In a case in which the second IE carries a plurality of third IEs, the plurality of third IEs may be IEs of different types. The plurality of third IEs may respectively include corresponding third IEIs. In this case, for a third IE in the plurality of third IEs, a type of the third IE may be determined based on the first IEI, a second IEI corresponding to a second IE that carries the third IE, and a third IEI corresponding to the third IE.

The value of the first IEI is not limited in embodiments of this application. For example, the value of the first IEI may be a value specified in a protocol, for example, a value in hexadecimal that is not used yet and may be used as a value of an IEI. The value may be considered as a to-be-determined (to be determined) value, and the to-be-determined value may be used to specifically identify the type of the first IEI. As a specific example, it is assumed that 80 in hexadecimal (which certainly may be another value and is merely an example herein) is not used as an IEI currently. In this case, the value of the first IEI may be set to 80 in hexadecimal, to identify that the first IE is a nested IE.

Alternatively, an existing IEI may be used as the value of the first IEI. For example, when the first IE is an IE of a type 6, an existing hexadecimal value in 70 to 7F may be used for the first IEI. In this case, a replaced IE may be defined by using another IEI. For example, the originally replaced IE may be nested in the first IE, and a type of the replaced IE is identified by the first IEI and the second IEI. Preferably, when an existing IEI is used as the value of the first IEI, a value in hexadecimal in 70 to 7B may be used, to prevent the first device from discarding an entire NAS message because the first device cannot understand the first IE. As a specific example, the value of the first IEI may be set to 70 in hexadecimal, to identify that the first IE is a nested IE, and an IE (an NSSRG information IE) identified by the replaced 70 may be nested in the first IE and jointly identified by the first IEI (70) and the second IEI (for example, 70 or another value). That is, in this embodiment of this application, 70 in hexadecimal may be used to identify the first IEI, and 70-70 may be used to identify the replaced IE (the NSSRG information IE).

In some embodiments, a to-be-determined value may be used as the value of the second IEI, and is used to specifically identify the second IE. Alternatively, an existing IEI may continue to be used. In this case, the replaced IE may be defined by using another IEI, for example, the originally replaced IE may be nested in the second IE. That the second IE is an IE of a type 6 is used as an example. When the second IE uses an existing IEI, it may refer to that a value range of the second IEI may be 70 to 7F. Preferably, when an existing IEI is used as the value of the second IEI, a value in hexadecimal in 70 to 7B may be used, to prevent the first device from discarding an entire NAS message because the first device cannot understand the second IE.

In some embodiments, the first IE or an IE carried in the first IE or both are IEs that are allowed to be ignored by the first device. However, embodiments of this application are not limited thereto, that is, the first IE or the IE carried in the first IE or both may be IEs that are not allowed to be ignored by the first device.

The IEs that are allowed to be ignored by the first device may refer to: after the first device receives a NAS message transmitted by the second device, if the first device cannot understand such IEs (the IEs that are allowed to be ignored by the first device) in the NAS message, the first device may directly ignore the IEs and process other IEs in the NAS message. In some embodiments, the IEs that are allowed to be ignored by the first device may also be referred to as no-comprehension required IEs (no-comprehension required IE). An IE of a type 6 is used as an example. When a value range of an IEI for a type 6 is represented as 70 to 7B in hexadecimal, it indicates that a format of the IE is TLV-E. If the first device cannot understand IEs in this range, the first device may ignore the IEs and process other IEs in the NAS message.

Correspondingly, in addition to the IEs that are allowed to be ignored by the first device, there may also be IEs that are not allowed to be ignored by the first device. After the first device receives the NAS message transmitted by the second device, the first device needs to discard the entire NAS message if the first device cannot understand such IEs (the IEs that are not allowed to be ignored by the first device) in the NAS message. In some embodiments, the IEs that are not allowed to be ignored by the first device may also be referred to as comprehension required IEs (comprehension required IE). An IE of a type 6 is still used as an example. When a value range of an IEI for a type 6 is 011111xx (represented as 7C to 7F in hexadecimal), it indicates that a format of the IE is TLV-E. IEs in this range need to be understood by the first device. If the first device cannot understand such IEs, the first device needs to discard the entire NAS message. Optionally, after discarding the entire NAS message, the first device further needs to return a mobility management status message (for example, a 5GMM status message) to the second device, to notify the second device that the NAS message is not successfully received. For example, the returned mobility management status message carries a cause value of why the NAS message is not successfully received, that is, carries a cause value "invalid mandatory information".

The IE carried in the first IE may refer to the second IE directly carried in the first IE, or may refer to the third IE carried through the second IE. This is not limited in this application. For example, the first IE, the second IE, and the third IE are all IEs that are allowed to be ignored by the first device. Alternatively, some IEs in the first IE, the second IE, and the third IE may be IEs that are allowed to be ignored by the first device.

As a specific example, the first IE is an IE that is allowed to be ignored by the first device. After receiving the NAS message transmitted by the second device, if the first device cannot understand the first IE in the NAS message, the first device may directly ignore the first IE and process other IEs except the first IE in the NAS message. That the first IE is an IE of a type 6 is used as an example. In a case in which a value range of the first IEI is 70 to 7B in hexadecimal, the first IE may be understood as an IE that is allowed to be ignored by the first device. However, embodiments of this application are not limited thereto. For example, when the first IE is an IE of a type 6, the value range of the first IEI may also be 7C to 7F in hexadecimal, that is, the first IE may be understood as an IE that is not allowed to be ignored by the first device.

In a case in which the first IE or the IE carried in the first IE or both are IEs that are allowed to be ignored by the first device, if the first device cannot understand the first IE or the IE carried in the first IE, the first device directly ignores the first IE or the IE carried in the first IE and processes other IEs. This manner has good compatibility.

As described above, in some embodiments, the first IE may be an IE of a type 6. In a case in which the first IE is an IE of a type 6, the IE carried in the first IE may be an IE of a type 6 or an IE of a type 4. This is not limited in embodiments of this application. For example, in a case in which the first IE carries the second IE, when the first IE is an IE of a type 6, the second IE may be an IE of a type 6 or an IE of a type 4. When the first IE is an IE of a type 4, the second IE may be an IE of a type 4.

In some embodiments, when the second IE is an IE of a type 6, an IE carried in the second IE may be an IE of a type 6 or an IE of a type 4. In other words, the third IE may be an IE of a type 6 or an IE of a type 4. When the second IE is an IE of a type 4, the third IE may be an IE of a type 4.

Figure 9:
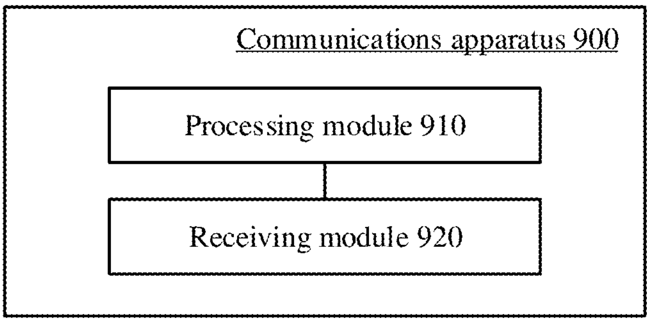
FIG. 9 is a schematic structural diagram of a communications apparatus according to an embodiment of this application.
Figure 10:
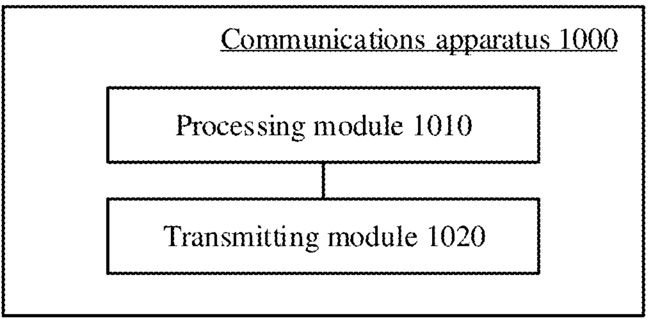
FIG. 10 is a schematic structural diagram of a communications apparatus according to another embodiment of this application.
Figure 11:
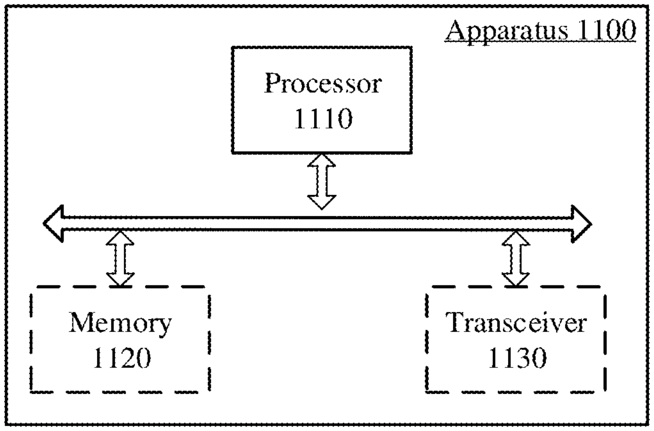
FIG. 11 is a schematic structural diagram of an apparatus according to an embodiment of this application.

The foregoing describes method embodiments of this application in detail with reference to FIG. 1 to FIG. 8, and the following describes apparatus embodiments of this application in detail with reference to FIG. 9 to FIG. 11. It should be understood that the descriptions of the method embodiments correspond to the descriptions of the apparatus embodiments, and therefore, for parts that are not described in detail, refer to the foregoing method embodiments.

FIG. 9 is a schematic structural diagram of a communications apparatus according to an embodiment of this application. The communications apparatus 900 shown in FIG. 9 may be applied to a first device, and the first device may be any first device mentioned above. The communications apparatus 900 may include a processing module 910 and a receiving module 920.

The processing module 910 may be configured to receive, by using the receiving module 920, a NAS message transmitted by a second device, where the NAS message includes a first information element IE, the first IE includes a first information element identifier IEI, the first IE carries a second IE, and the second IE includes a second IEI.

Optionally, a type of the second IE is determined based on the first IEI and the second IEI.

Optionally, the second IE carries a third IE, the third IE includes a third IEI, and a type of the third IE is determined based on the first IEI, the second IEI, and the third IEI.

Optionally, the first IE or an IE carried in the first IE or both are IEs that are allowed to be ignored by the first device.

Optionally, the first IE is an IE of a type 6, and a value range of the first IEI is 70 to 7B in hexadecimal.

Optionally, the NAS message is a registration accept message.

Optionally, the first IE is an IE of a type 6.

Optionally, the second IE is an IE of a type 6 or a type 4.

Optionally, an IE carried in the second IE is an IE of a type 6 or a type 4.

FIG. 10 is a schematic structural diagram of a communications apparatus according to another embodiment of this application. The communications apparatus 1000 shown in FIG. 10 may be applied to a second device, and the second device may be any second device mentioned above. The communications apparatus 1000 may include a processing module 1010 and a transmitting module 1020.

The processing module 1010 may be configured to transmit a NAS message to a first device by using the transmitting module 1020, where the NAS message includes a first information element IE, the first IE includes a first information element identifier IEI, the first IE carries a second IE, and the second IE includes a second IEI.

Optionally, a type of the second IE is determined based on the first IEI and the second IEI.

Optionally, the second IE carries a third IE, the third IE includes a third IEI, and a type of the third IE is determined based on the first IEI, the second IEI, and the third IEI.

Optionally, the first IE or an IE carried in the first IE or both are IEs that are allowed to be ignored by the first device.

Optionally, the first IE is an IE of a type 6, and a value range of the first IEI is 70 to 7B in hexadecimal.

Optionally, the NAS message is a registration accept message.

Optionally, the first IE is an IE of a type 6.

Optionally, the second IE is an IE of a type 6 or a type 4.

Optionally, an IE carried in the second IE is an IE of a type 6 or a type 4.

FIG. 11 is a schematic structural diagram of a communications apparatus according to an embodiment of this application. The dashed lines in FIG. 11 indicate that the unit or module is optional. The apparatus 1100 may be configured to implement the methods described in the foregoing method embodiments. The apparatus 1100 may be a chip, a terminal device, or a network device.

The apparatus 1100 may include one or more processors 1110. The processor 1110 may allow the apparatus 1100 to implement the methods described in the foregoing method embodiments. The processor 1110 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1100 may further include one or more memories 1120. The memory 1120 stores a program, where the program may be executed by the processor 1110, to cause the processor 1110 to execute the methods described in the foregoing method embodiments. The memory 1120 may be independent of the processor 1110 or may be integrated into the processor 1110.

The apparatus 1100 may further include a transceiver 1130. The processor 1110 may communicate with another device or chip by using the transceiver 1130. For example, the processor 1110 may transmit data to and receive data from another device or chip by using the transceiver 1130.

An embodiment of this application further provides a computer-readable storage medium for storing a program. The computer-readable storage medium may be applied to a terminal or a network device provided in embodiments of this application, and the program causes a computer to execute the methods to be executed by the terminal or the network device in various embodiments of this application.

An embodiment of this application further provides a computer program product. The computer program product includes a program. The computer program product may be applied to a terminal or a network device provided in embodiments of this application, and the program causes a computer to execute the methods to be executed by the terminal or the network device in various embodiments of this application.

An embodiment of this application further provides a computer program. The computer program may be applied to a terminal or a network device provided in embodiments of this application, and the computer program causes a computer to execute the methods to be executed by the terminal or the network device in various embodiments of this application.

It should be understood that the terms “system” and “network” in this application may be used interchangeably. In addition, the terms used in this application are only used to illustrate specific embodiments of this application, but are not intended to limit this application. The terms “first”, “second”, “third”, “fourth”, and the like in the specification, claims, and drawings of this application are used for distinguishing different objects from each other, rather than defining a specific order. In addition, the terms “include” and “have” and any variations thereof are intended to cover a non-exclusive inclusion.

In embodiments of this application, the “indication” mentioned may be a direct indication or an indirect indication, or indicate an association. For example, if A indicates B, it may mean that A directly indicates B, for example, B may be obtained from A. Alternatively, it may mean that A indicates B indirectly, for example, A indicates C, and B may be obtained from C. Alternatively, it may mean that there is an association between A and B.

In embodiments of this application, “B corresponding to A” means that B is associated with A, and B may be determined based on A. However, it should also be understood that, determining B based on A does not mean determining B based only on A, but instead B may be determined based on A and/or other information.

In embodiments of this application, the term “corresponding” may mean that there is a direct or indirect correspondence between two elements, or that there is an association relationship between two elements, or that there is a relationship of “indicating” and “being indicated”, “configuring” and “being configured”, or the like.

In embodiments of this application, “pre-defining” or “pre-configuring” can be implemented by pre-storing corresponding code or a corresponding table in a device (for example, including a terminal device and a network device) or in other manners that may be used for indicating related information. A specific implementation thereof is not limited in this application. For example, pre-defining may indicate being defined in a protocol.

In embodiments of this application, the “protocol” may indicate a standard protocol in the communication field, which may include, for example, an LTE protocol, an NR protocol, and a related protocol applied to a future communications system. This is not limited in this application.

In embodiments of this application, the term “and/or” is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects.

In embodiments of this application, sequence numbers of the foregoing processes do not mean execution sequences. The execution sequences of the processes shall be determined based on functions and internal logic of the processes, and shall not constitute any limitation on the implementation processes of embodiments of this application.

In several embodiments provided in this application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not executed. In addition, the displayed or discussed mutual couplings or direct couplings or communication connections may be implemented by using some interfaces. The indirect couplings or communication connections between apparatuses or units may be implemented in electrical, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objectives of the solutions of embodiments.

In addition, functional units in embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

receiving, by a first device, a non-access stratum (NAS) message transmitted by a second device, wherein the NAS message comprises a first information element (IE), the first IE comprises a first information element identifier (IEI), and the first IE carries a second IE, wherein the second IE comprises a second IEI, and a type of the second IE is determined based on the first IEI and the second IEI, the first IE is an IE of a type 6, the second IE is an IE of the type 6.

2. The method according to claim 1, wherein the first IE or an IE carried in the first IE or both are IEs that are allowed to be ignored by the first device.

3. The method according to claim 1, wherein the first IE is an IE of a type 6, and a value of the first IEI is a value in 70 to 7F in hexadecimal.

4. The method according to claim 1, wherein the NAS message is a registration accept message.

5. A first device, comprising a memory and a processor, wherein the memory is configured to store a program, and the processor is configured to invoke the program in the memory, to cause the first device to perform:

receiving a non-access stratum (NAS) message transmitted by a second device, wherein the NAS message comprises a first information element (IE), the first IE comprises a first information element identifier (IEI), and the first IE carries a second IE, wherein the second IE comprises a second IEI, and a type of the second IE is determined based on the first IEI and the second IEI, the first IE is an IE of a type 6, the second IE is an IE of the type 6.

6. The first device according to claim 5, wherein the first IE or an IE carried in the first IE or both are IEs that are allowed to be ignored by the first device.

7. The first device according to claim 5, wherein the first IE is an IE of a type 6, and a value of the first IEI is a value in 70 to 7F in hexadecimal.

8. The first device according to claim 5, wherein the NAS message is a registration accept message.

9. A second device, comprising a memory and a processor, wherein the memory is configured to store a program, and the processor is configured to invoke the program in the memory, to cause the second device to perform:

transmitting a non-access stratum (NAS) message to a first device, wherein the NAS message comprises a first information element (IE), the first IE comprises a first information element identifier (IEI), and the first IE carries a second IE, wherein the second IE comprises a second IEI, and a type of the second IE is determined based on the first IEI and the second IEI, the first IE is an IE of a type 6, the second IE is an IE of the type 6.

10. The second device according to claim 9, wherein the first IE or an IE carried in the first IE or both are IEs that are allowed to be ignored by the first device.

11. The second device according to claim 9, wherein the first IE is an IE of a type 6, and a value of the first IEI is a value in 70 to 7F in hexadecimal.

* * * * *